J. W. CROWLEY, Jr.
CLUTCH.
APPLICATION FILED NOV. 15, 1919.
1,407,384.
Patented Feb. 21, 1922.
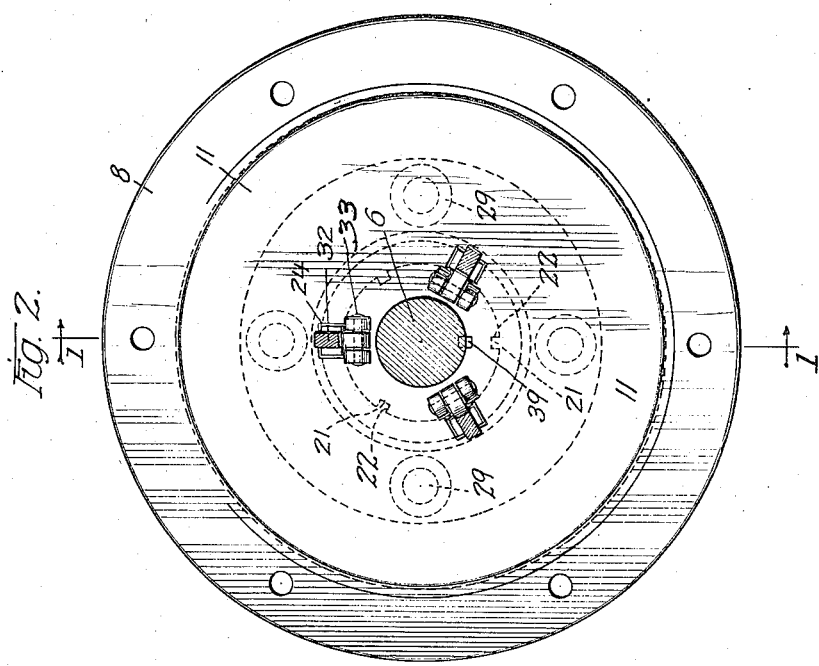
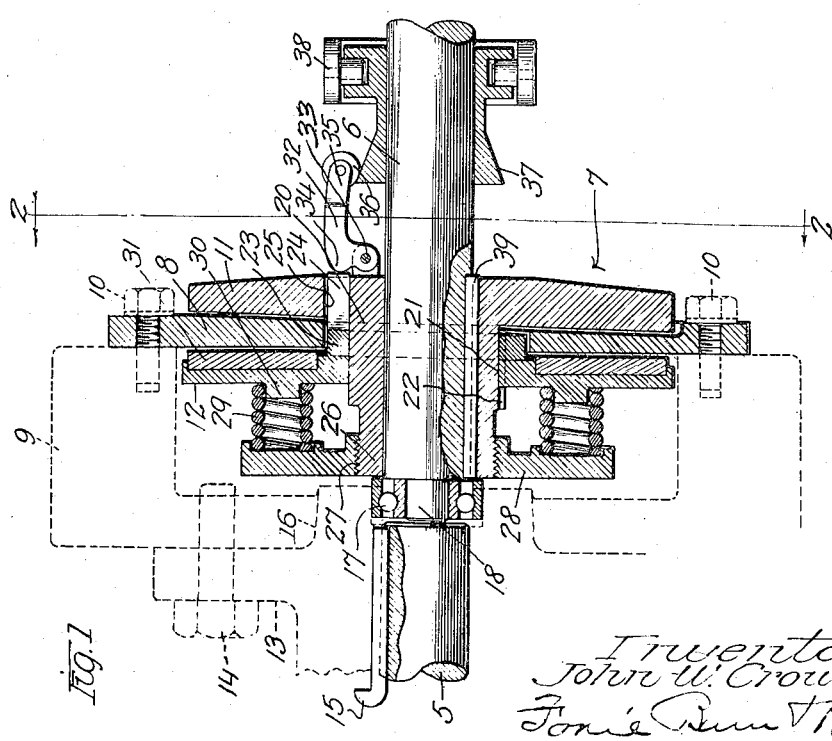

UNITED STATES PATENT OFFICE.

JOHN W. CROWLEY, JR., OF CHICAGO, ILLINOIS.

CLUTCH.

1,407,384.  Specification of Letters Patent.  Patented Feb. 21, 1922.

Application filed November 15, 1919. Serial No. 338,163.

*To all whom it may concern:*

Be it known that I, JOHN W. CROWLEY, Jr., a citizen of the United States, residing at Chicago, in the county of Cook and State of Illinois, have invented certain new and useful Improvements in Clutches, of which the following is a specification.

The invention relates to clutches.

One of the objects is to provide a clutch in which one clutch member is yieldingly held between two similar members and provision of means to move the two latter members away from the intermediate member.

Another object is to provide means to automatically wedge the clutch members together against a yielding means arranged to automatically bring them together.

Another object is to simplify and improve clutch structures.

Other, further and more specific objects of the invention will become readily apparent, to persons skilled in the art, from a consideration of the following description when taken in connection with the drawings, wherein:

Fig. 1 is a section taken on line 1—1 of Fig. 2.

Fig. 2 is a transverse section taken on line 2—2 of Fig. 1.

In both views the same reference characters are employed to indicate similar parts.

In the drawings 5 is represented as a driving member or shaft and 6 as a similar shaft or driven member. The clutch 7 yieldingly connects the members together. The object sought is to provide a clutch, of improved construction, which will yieldingly connect two rotatable members together and so arranged that any suddenly applied overload will permit relative slipping of the members to avoid shock which would impose a dangerous strain to the power producing motor and connecting transmission gearing.

The central, or intermediate member, or disc 8, is arranged to be bolted to a fly wheel 9, as by bolts or cap screws 10, shown in dotted lines. The slidable clutch members 11 and 12 in the illustrated embodiment, are the driven members, when the shaft 5 is directly connected to the power producing source. The fly wheel may be connected to a flange 13 by screws 14 and the flange connected to the shaft 5 by any convenient means, such as the key 15. The hub 16 of the flange may contain a ball bearing structure 17 to receive the reduced end 18 of the shaft 6.

In the illustrated clutch structure the transversely tapered disc 11 is shown to be an integral part of the hub 20 and the disc 12 is slidable on the hub, but is rotatably secured to the hub by parts 21 that enter spaced-apart grooves 22 in the hub 20, so that the discs 11 and 12 are rotatably fixed, but are axially movable with respect to each other. Between the discs 11 and 12 and loosely surrounding the hub 20 is a wearing ring 23, and bearing against the outer surface of the wearing ring are three lugs 24, that pass through openings 25 made between the disc 11 and the hub 20, so that when pressure is applied, in an axial direction, to the outer end of the lug 24 the discs 11 and 12 are moved axially away from each other and out of contact with the intermediate disc 8. The disc 12 is moved on the hub and the disc 11 and hub 20 are moved on shaft 6. The reduced end 26, of the hub 20, is screw threaded, as at 27, and on the outer reduced end of the hub, axially adjustable thereon by cooperating screw threads, is a spring support or disc 28, having an annular groove to contain the ends of a series of helical springs 29. The springs surround lugs 30 projecting laterally from the disc 12, but the disc 28 is free to move circumferentially with respect to the springs, the springs sliding in the groove so that when the disc 28 is rotated upon the smaller end 26 of the hub 20, to approach more closely the disc 12, the tension of the springs 29 is thus increased and the clutch members 11 and 12 more firmly held in contact with the intermediate member 8. A wearing ring 31 of suitable character may be placed between the discs 8 and 12, a ring of hard wood being a substance that is well suited for the purpose. The disc or ring 8 is transversely tapered across its diameter, so that the tapered surface is in a transverse plane, less than 90 degrees from its axis, as clearly shown in exaggerated form in Fig. 1, and a similar cooperating tapered confronting surface is provided on the disc 11. Now if the discs 8 and 11 are rotatively displaced from the positions shown in Fig. 1 when the springs press them together, greater stress will be applied to the springs 29 by the wedging effect thus produced between the discs, but when the apex or thickest parts of the tapered surfaces come together, that is to say when the thickest portion of the two discs confront each other, maximum torque will be transmitted through the clutch. If this torque is exceeded then the thicker portions of one of the clutching members 8 or 9 will be further rotatively displaced and the driven shaft 6 will not be so positively rotated. In the event that the overload persists, this action will be repeated and no damage will be done to the transmitting machinery, because the springs 29 will force the parts together sufficiently to transmit a given torque, which should be the maximum load to be imposed upon the power producing means.

The lugs 24, located in the openings 25, through the disc 11 and immediately above the hub 20, are each pushed inwardly by a bell-crank lever 32, which is pivoted, as at 33, and each has a laterally projecting heel 34 that immediately engages the respective lugs 24. There are three such structures, more clearly shown in Fig. 2, in the particular exemplification. The extended end 35 of the bell crank lever carries a roller 36 which rides upon an axially movable truncated cone 37, and when these rollers are in the positions shown in Fig. 2, the discs or rings 11 and 12 are forced apart and away from the intervening disc 8 and therefore the clutch is open and the springs 29 are under increased tension effected by the clutch opening means. When the cone 37 is moved toward the clutch, by the yoke lever 38, then the springs 29 will again force the outer clutch members into contact with the intermediate member and power will be transmitted through the clutch mechanism. The hub 20 is rotatably secured to the shaft 6 by the feather 39, but is slidable to a limited extent thereon.

While I have herein shown a single embodiment of my invention, for the purpose of clear disclosure, it will be manifest, to persons skilled in the art, that many changes may be made in the general arrangement and configuration of the parts within the scope of the appended claims.

Having described my invention, what I claim is:—

1. A clutch having in combinative association two axially movable rotatable members, one of which has an engaging surface in a plane less than ninety degrees from its axis of rotation; an intermediate clutch member having a similar cooperating inclined surface; a spring to normally hold the members in frictional engagement and means to separate the members and move them out of engagement with the intermediate member against the resistance of the spring.

2. A clutch having in combinative association two axially movable rotatable members, one of which has an engaging surface in a plane less than ninety degrees from its axis of rotation; an independently rotatable, intermediate clutch member having a similar cooperating, inclined surface; a spring to normally hold the members in frictional engagement and means to move both outer members from contact with the intermediate member against the resistance of the spring.

3. A clutch having in cooperative association two flat rings carried by a hub, for rotation therewith, one of which rings is axially movable on the hub, the other axially movable with the hub, the engaging surfaces of one ring being inclined from an angle ninety degrees from its axis of rotation; a hub, by which the rings are carried, having one end threaded; a spring support threaded on one end of the hub; a spring between the support and the adjacent axially movable ring, to hold the clutch members in contact with a cooperating intermediate clutch member; another clutch member comprising an intermediate similarly inclined ring and means to separate the outer engaging rings from the intermediate ring.

4. A clutch having in cooperative association a hub slidable on shaft 6, expanded at one end into a disc or ring 11 and threaded at the other end; a ring, slidable on the hub, said rings forming clutch members rotatable with the hub, one of which has its engaging surface inclined into a plane less than ninety degrees from its axis of rotation; an intermediate clutch member having a similar cooperating inclined surface; a spring to hold the outer rings in contact with the intermediate ring; a lug, 24, passing through the ring 11 to axially move the ring 12 on the hub; a lever connected to the hub to move the hub on the shaft and to move the ring on the hub, by pressure applied thereby to said lug and means to move said lever to disengage said clutch members.

5. A clutch having in combinative association a hub expanded at one end into a flat ring, or disc clutch member, and slidable on a shaft; a spring support axially adjustable on the other end of the hub; a clutch member axially movable on the hub and rotatably connected to the first mentioned clutch member; a spring between the spring support and the second clutch member; a third clutch member between the first and second clutch members and means extending through the first clutch member to move the first and second clutch members out of contact with the third clutch member.

In testimony whereof I hereunto subscribed my name.

JOHN W. CROWLEY, Jr.